United States Patent
Flammer

(10) Patent No.: US 10,215,337 B2
(45) Date of Patent: Feb. 26, 2019

(54) PRESSURE VESSEL AND METHOD FOR THE PRODUCTION OF SUCH A VESSEL

(71) Applicant: Elkamet Kunststofftechnik GmbH, Biedenkopf (DE)

(72) Inventor: Eberhard Flammer, Biedenkopf (DE)

(73) Assignee: ELKAMET KUNSTSTOFFTECHNIK GMBH, Biedenkopf (DE)

( * ) Notice: Subject to any disclaimer, the term of this patent is extended or adjusted under 35 U.S.C. 154(b) by 1366 days.

(21) Appl. No.: 13/938,298

(22) Filed: Jul. 10, 2013

(65) Prior Publication Data

US 2014/0014667 A1    Jan. 16, 2014

(30) Foreign Application Priority Data

Jul. 16, 2012  (DE) .................. 10 2012 013 937

(51) Int. Cl.
*B32B 3/26* (2006.01)
*F17C 1/16* (2006.01)
(Continued)

(52) U.S. Cl.
CPC .............. *F17C 1/16* (2013.01); *B29C 53/602* (2013.01); *B29C 70/32* (2013.01); *B29C 70/48* (2013.01); *B29C 70/547* (2013.01); *B29C 70/548* (2013.01); *B29D 22/003* (2013.01); *F17C 7/00* (2013.01); *B29L 2031/7156* (2013.01); *F17C 2201/0109* (2013.01); *F17C 2201/056* (2013.01); *F17C 2201/058* (2013.01); *F17C 2203/0604* (2013.01); *F17C 2203/066* (2013.01); *F17C 2203/0621* (2013.01); *F17C 2203/0663* (2013.01); *F17C 2203/0675* (2013.01); *F17C 2205/0305* (2013.01); *F17C 2209/2127* (2013.01); *F17C 2209/2145* (2013.01); *F17C 2221/012* (2013.01); *F17C 2221/033* (2013.01); *F17C 2223/0123* (2013.01); *F17C 2223/036* (2013.01); *F17C 2270/0171* (2013.01); *F17C 2270/0178* (2013.01); *Y02E 60/321* (2013.01)

(58) Field of Classification Search
CPC ... B29C 53/602; B29C 53/8066; B29C 70/48; F17C 1/00
See application file for complete search history.

(56) References Cited

U.S. PATENT DOCUMENTS 4,876,050 A * 10/1989 Horton ................ B29C 35/0222
264/102
5,025,943 A *  6/1991 Forsman ............... B29C 53/602
220/589

(Continued)

FOREIGN PATENT DOCUMENTS

DE         205846 A1    1/1984
DE       69222278 T2    4/1998
(Continued)

*Primary Examiner* — Stella K Yi
(74) *Attorney, Agent, or Firm* — Leydig, Volt & Mayer, Ltd.

(57) ABSTRACT

A pressure vessel having a hollow body wound with a continuous filament, whereby the filament is embedded in a thermoplastic matrix, is provided, as well as a method for producing such a vessel. The method involves: (i) wrapping a hollow body with at least one continuous filament; (ii) impregnating the filament winding with a polymerizable mixture, whereby the wound body is inside a mold that surrounds the wound body; and (iii) polymerizing the polymerizable mixture in order to form a plastic matrix that embeds the filament winding.

46 Claims, 3 Drawing Sheets

(51) Int. Cl.

| | |
|---|---|
| *B29D 22/00* | (2006.01) |
| *B29C 70/48* | (2006.01) |
| *B29C 53/60* | (2006.01) |
| *F17C 7/00* | (2006.01) |
| *B29C 70/32* | (2006.01) |
| *B29C 70/54* | (2006.01) |
| *B29L 31/00* | (2006.01) |

(56) References Cited

U.S. PATENT DOCUMENTS

| | | | |
|---|---|---|---|
| 5,837,181 A * | 11/1998 | Leimbacher | C08G 69/14 |
| | | | 264/134 |
| 6,230,922 B1 | 5/2001 | Rasche et al. | |
| 6,605,171 B1 | 8/2003 | Debalme et al. | |
| 7,032,767 B2 | 4/2006 | Funck | |
| 7,959,027 B2 | 6/2011 | Weber | |
| 2002/0150752 A1 | 10/2002 | Debalme et al. | |
| 2005/0038222 A1* | 2/2005 | Joshi | B29C 53/8066 |
| | | | 528/44 |
| 2007/0164561 A1 | 7/2007 | Kwon et al. | |

FOREIGN PATENT DOCUMENTS

| | | |
|---|---|---|
| DE | 19751411 C1 | 1/1999 |
| DE | 10000705 A1 | 7/2001 |
| DE | 10106923 A1 | 9/2002 |
| DE | 102006004121 A1 | 7/2007 |
| EP | 0333013 A1 | 9/1989 |
| EP | 0547330 B1 | 9/1997 |
| EP | 1989477 A1 | 11/2008 |

\* cited by examiner

PRESSURE VESSEL AND METHOD FOR THE PRODUCTION OF SUCH A VESSEL

CROSS-REFERENCE TO RELATED APPLICATIONS

Priority is claimed to German Patent Application No. DE 10 2012 013 937.3, filed on Jul. 16, 2012, the entire disclosure of which is incorporated by reference herein.

FIELD

The invention relates to a pressure vessel consisting of a hollow body wound with a continuous filament, whereby the filament is embedded in a thermoplastic matrix, and it also relates to a method for the production of such a vessel.

BACKGROUND

Pressure vessels are used in many areas of plant engineering, mechanical engineering and automotive construction in numerous applications. As a rule, they are structured either spherically or else have an elongated cylindrical shape, whereby the end sections are hemispherical or semi-ellipsoidal or else are configured as a torispherical head. Typical areas of use for such pressure vessels include tanks for compressed gases, for example, natural gas (CNG) or hydrogen ($H_2$), or hydraulic accumulators, for instance, for the emergency lubrication of systems or for brake energy regeneration in trucks.

Pressure vessels were originally configured as load-bearing solid metal tanks made of steel, aluminum or other metal materials. However, especially in conjunction with mobile applications, possibilities for weight reduction were sought. Today's state of the art comprises so-called type IV pressure vessels for which a liner that is resistant and tight vis-à-vis the filling and/or operating media and that is essentially not load-bearing and made of plastic is surrounded on the outside by a load-bearing outer shell made of filaments embedded in synthetic resin.

The classification of the vessels can be found in ISO standards 11119-1 to 11119-3 and as such, has also been incorporated into ECE regulation 110. In short, it can be said that the Type I vessel is made of metal, the Type II vessel has a metal liner that is reinforced with a continuous filament impregnated in resin that is only wound in the cylindrical area in the direction of the circumference, while the end sections are not reinforced, the Type III vessel has a metal liner and is reinforced with a continuous filament impregnated in resin that is completely wound around the metal vessel, and the Type IV vessel has a non-metal liner (full composite construction) that is likewise completely reinforced with a continuous filament winding embedded in a resin matrix.

The liner used for the Type IV vessel is also referred to as a core tank. As a rule, this is a body that is made of suitable plastics such as, for example, polyethylene (PE), polypropylene (PP) or polyamides (for example, PA6, PA12) by means of a blow-molding or rotational-molding method, whereby the connection elements needed for a given application are integrated into at least one of the two end sections.

According to the state of the art, which is described, for example, in U.S. Appln. No. 2007/0164561, in order to produce the load-bearing outer shell, the liner is wound with continuous filaments or with rovings that are impregnated with liquid, curable thermosetting resins. Such resins are especially epoxy, phenol, polyester or vinyl ester resins. After the wet-winding process, the resin matrix is cured, as a rule, at a high temperature.

As an alternative, filaments or rovings that have been pretreated or impregnated with thermoplastics are used in the winding process. Methods for their production are described, for example, in U.S. Appln. No. 2002/0150752. For the subsequent solidification of the plastic matrix in which the filament winding is embedded, a sintering process at a high temperature is required after the winding, and in this process, the thermoplastic matrix that embeds the filaments is solidified. Such a process is known, for example, from U.S. Pat. No. 6,605,171 B1.

European patent document EP 0 333 013 describes a special method for winding the liner with the filament material.

German patent documents DE 197 51 411, DE 100 00 705 and DE 10 2006 004 121 as well as European patent document EP 1 989 477 do not deal with the production of the pressure vessel as such but rather, they describe various methods as to how a connecting section, neck piece or the like can be shaped onto or integrated into the liner.

Irrespective of whether a thermosetting matrix or a thermoplastic matrix is used to embed the filament winding in the outer shell and how they are further processed, however, such pressure vessels of Type IV entail a number of drawbacks.

When pressure vessels are produced with a thermosetting matrix in the fiber-reinforced outer shell, the wet-winding process using impregnated filaments calls for frequent downtimes so that the installations and the surroundings can be cleaned from the splashed resin material that sprays or drips off the impregnated filaments during the further processing. Subsequently, the vessels are placed for several hours in ovens or tunnel furnaces at a high temperature in order to cure the thermosetting resin material. At times, this has to be done while continuously rotating the workpieces so that the initially still liquid resin does not drip off. All in all, a greater investment in terms of time and costs is involved, which has a detrimental effect on the cost-efficiency of such a method. Moreover, the presence of the thermosetting matrix means that the pressure vessel cannot be recycled through the modality of material recovery at the end of its service life.

In contrast to reinforcement with a thermosetting matrix, pressure vessels having filament-plastic composite reinforcement with a thermoplastic matrix can be recycled through the modality of material recovery, especially if the liner and the matrix are made of the same thermoplastic. It is a drawback, however, that, as described in U.S. Appln. No. 2002/0150752, the process that precedes the wrapping, namely, the production of the filaments provided with the thermoplastic, is complex and constitutes a major time and cost factor.

However, if the filament is impregnated with polymer thermoplastic matrix material immediately before the liner is wound, so that the filaments are wound onto the liner even before the plastic cools off and solidifies, then, as is the case with the wet-winding process using thermosetting plastics, the surroundings will get dirty from dripping and splashing.

In principle, with the use of a thermoplastic matrix, it would also be conceivable to carry out the winding with a filament that is not provided with matrix material and to subsequently incorporate a thermoplastic matrix in which the filaments would then be embedded. However, it has been found here that a complete impregnation—that is to say, without voids or defects—of the wound filament packet is practically not possible, so that the resultant impregnation of the filament material with the matrix material is inadequate. As a result, no pressure vessel of Type IV can be produced that reliably meets the quality assurance requirements.

Therefore, it is an objective of the invention to provide a method in which a pressure vessel of Type IV can be produced without the need for frequent cleaning of the system or for long throughput times in the process chain, and which nevertheless reliably impregnates the filaments.

SUMMARY

An aspect of the invention provides a method for producing a pressure vessel, the method comprising: (i) winding a hollow body with a continuous filament, to obtain a filament winding upon the hollow body, as a wound body; (ii) impregnating the filament winding with a polymerizable mixture while the wound body is inside a mold that surrounds the wound body; and (iii) polymerizing the polymerizable mixture so as to form a plastic matrix that embeds the filament winding.

BRIEF DESCRIPTION OF THE DRAWINGS

Aspects of the present invention are described in even greater detail below based on the exemplary figures. The invention is not limited to the exemplary embodiments. All features described and/or illustrated herein can be used alone or together in different combinations in embodiments of the invention. The features and advantages of various embodiments of the present invention will become apparent by reading the following detailed description with reference to the attached drawings which illustrate the following.

DETAILED DESCRIPTION

Figure 1:
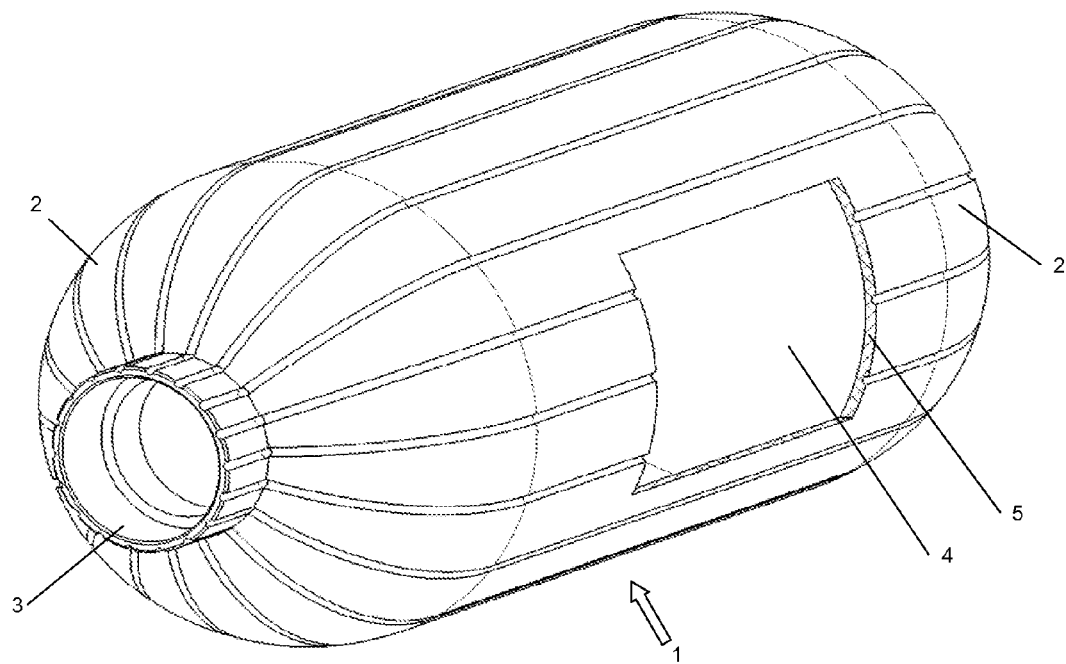
FIG. 1 a schematic 3D depiction of a hollow body.

In a first step of an embodiment of the method, a continuous filament is wound around a hollow body (=liner). According to DIN 60000, the term "continuous filament" as set forth in the invention is a linear structure of practically unlimited length. As a rule, the liner is a shaped vessel made of thermoplastic by means of a blow-molding or rotational-molding method.

In a second step, the filament winding is impregnated with a polymerizable mixture. Here, the wound liner is inside a mold that completely surrounds the liner. If a monomer or oligomer polymerizable mixture rather than a thermoplastic polymer melt is used to impregnate the filament winding, then the material used for the impregnation is much more liquid and less viscous, as a result of which voids and defects in the sheathing can be practically ruled out since the mixture can flow into every hollow space. Moreover, the temperatures needed for the processing are lower than those needed for processing the finished plastics in melt form. These temperatures are below the melting temperature of the finished plastic.

In a third step, the mixture is then polymerized, forming a matrix in which the filament is embedded.

Defects in the impregnation of the filaments and thus in the thermoplastic matrix formed can be prevented especially reliably if a mixture is used that has a viscosity <500 mPa·s, preferably ≤200 mPa·s, especially preferably ≤100 mPa·s and very especially preferably ≤20 mPa·s. This ensures a sufficient flowability of the material, which permits a complete soaking or impregnation of the filament winding.

The viscosity can be determined, for example, with a rotational viscometer in which a body is rotated in the mixture by means of a motor. During the rotation, the required torque is measured. On this basis and also from the precise geometry of the rotating body employed and of the outer vessel as well as from the rotational speed, the dynamic viscosity of the liquid can be determined.

It has also been found to be favorable to use a thermoplastic matrix that especially preferably is made of the same material as the liner. As a result, within the scope of material recovery, the entire vessel can be comminuted, thereby using familiar processes to create a thermoplastic material in powder, granule, pellet or other form with a high content of short fibers. This material can be added to compatible (preferably identical) thermoplastics during the production of short fiber-reinforced components, for example, in injection-molding processes.

In particular, it has proven to be favorable for the matrix to contain polyamide 6, polyamide 12, copolymers and/or mixtures of polyamide 6 and polyamide 12, or polybutylene terephthalate, and preferably, exclusively these compounds enter into the formation of the matrix. The use of polyurethanes and/or polydicyclopentadiene is also possible. All of these materials have in common that they can be made out of polymerizable mixtures that consist of their monomers or oligomers and that have very low viscosities. A melt of ε-caprolactam as the precursor compound of polyamide 6 at 100° C. [212° F.], for example, has a viscosity of about 10 mPa·s, whereby especially low-molecular additives, owing to their small amounts, practically do not change the viscosity of the mixture. Impact-resistance modifiers or other additives with a certain degree of polymerization increase the viscosity of the melt.

The thermoplastics polyamide 6 and 12 are obtained by the anionic polymerization of lactams, while polybutylene terephthalate (PBT) is formed from cyclic butylene terephthalate oligomers that are commercially available, for example, under the brand name CBT®; polyurethanes (PU) are plastics or synthetic resins that are made from the polyaddition reaction of dialcohols (dioles) or polyols with polyisocyanates, whereby, as a rule, however, bifunctional alcohols are reacted with bifunctional isocyanates for the production of thermoplastic polyurethanes. Polydicyclopentadiene (PDCPD) is produced by ring-opening metathesis polymerization from endo-dicyclopentadiene, commercially available as Telene®.

Polymerizable mixtures for the production of polyamide 6 contain ε-caprolactam as well as catalyzing and activating additives. Strong bases such as sodium hydroxide solutions or potassium hydroxide solutions can be used as the catalyst for an anionic polymerization of ε-caprolactam; in actual practice, bases on the basis of metallo-organic compounds such as, for example, sodium alcoholates and sodium amides are also often used. It is especially also favorable to use alkali metals, alkali metal salts of lactams, alkali metal alcoholates, alkali metal hydroxides and especially preferably alkali metal hydrides. It is likewise suitable to use alanates according to the formula $M[AlH_x(OR)_{4-x}]_n$, wherein M=metal of the group Ia or IIa of the periodical table,
R=$CH_2CH_2OR'$ wherein R'=$C_1$-$C_4$-alkyl,
x=1 to 4,
n=valence of M;

Examples of this are Na-bis-(2-methoxy-ethoxy)dihydride alanate or Na-tetra-(ε-caprolactam) alanate.

In principle, all acylating compounds can be used as activators, either directly or else after reaction with the appertaining monomer of the polyamide precursor compound; these include, among others, acid anhydrides and acid halides (especially acid chlorides), organic peroxides, esters, lactones, ureas and thioureas as well as linear or cyclic isocyanates such as, for example, hexamethylene-1,6-bis-carbamido-caprolactam, and allophanates or mixtures of these substances. Low-molecular polymers, often referred to as prepolymers, with N-acyl lactam terminal groups, can also be used. It is especially favorable to use acyl caprolactam, polycarbodiimides and monoisocyanates and polyisocyanates and their derivatives.

Moreover, it has proven to be especially favorable that the filaments are wound in such a way that hollow spaces are systematically formed in the filament winding, as a result of which it can be ensured even more effectively that the winding is impregnated uniformly. Moreover, then the polymerizable mixture can be injected at low pressure which, on the one hand, minimizes the stress on the system and, on the other hand, lowers the operating costs. Such a winding, in which hollow spaces are systematically formed, can be made, for example, in that the filaments are provided with "spacers" distributed over their circumference as well as over their length just like barbed wire, as a result of which the filament is no longer wound flush with the other filaments.

The complete soaking and impregnation of the filament winding can also be promoted in that deep grooves are created on the outside of the liner. After the liner has been wound, the grooves are underneath the filament winding, thereby forming flow channels there for the polymerizable mixture, and this simplifies the soaking and impregnation of the filament winding when the mold is being filled. These grooves or channels are filled with the matrix material in the finished pressure vessel.

In an advantageous embodiment, these grooves can continue on the outer circumference of the connection element and they can be used as an opening for filling and/or venting the mold.

In an advantageous embodiment of the invention, the filament is an aramide, boron, aluminum oxide, carbon or glass fiber, since such fibers can be easily developed industrially and, at the same time, are chemically inert vis-à-vis the plastic matrix.

It has proven to be advantageous for the filament to be coated with a material that, interacting with the polymerizable mixture, triggers or at least accelerates the polymerization. This could be, for example, a suitable catalyst or activator. In this manner, it can be ruled out that the mixture already polymerizes partially before being injected, which could, for instance, clog the nozzles.

Moreover, it has proven to be favorable if the inner contour of the mold is in direct contact with the outer contour of the winding at every point, since in this manner, the mold can precisely define the outer contour of the later outer shell and thus also of the finished pressure vessel.

However, it can also be advantageous for there to be a gap between the inner contour of the mold and the outer contour of the winding in at least one partial area. In this manner, in the same process step, the outside of the load-bearing filament-plastic composite layer can be provided completely or else only partially or in certain areas with an outer shell that is not fiber-reinforced and that is made of the same material as the thermoplastic matrix. Parameters such as the layer thickness, the surface structure and the like can be selected in such a way that additional properties (protection of the filaments against mechanical stress or light exposure, esthetic aspects, etc.) are obtained. When the shape of the mold is appropriately designed, additional functional elements can be attached in one piece to the pressure vessel. These functional elements can be, for example, fastening elements or the like. Therefore, in a manner of speaking, the method provides a way to combine the soaking and impregnation process with a reactive injection molding process (RIM).

Furthermore, reinforcing fillers (glass fibers, carbon fibers and polymer fibers), non-reinforcing fillers (for example, calcium sulfate, calcium carbonate, barium sulfate, silicates such as wollastonite, kaolin, mica, hornblende, quartz, glass beads and PTFE), flame-retardants (for example, phosphorus compounds such as organic phosphates, phosphates, ammonium polysulfates and halogenated organic compounds), mold-release agents (silicon oils and high-melting waxes), release agents and lubricants (for example, paraffinic oils), antistatic agents (for example, quaternary ammonium salts), agents to increase the thermal and electric conductivity (carbon black, metals, metal oxides and carbon-nanotubes), dyes, pigments, stabilizers (for example, UV stabilizers such as benzophenone derivatives, anti-hydrolysis agents such as carbodiimides, polycarbodiimides, antioxidants such as, for instance, sterically hindered amines and phenols), plasticizers (e.g. adipates and phthalates), anti-blocking agents (e.g. paraffin wax, polyethylene wax and montan wax), thickeners (e.g. vinyl aromatic diene copolymers) and processing additives such as, for example, reactive retarders and nucleation agents such as molybdenum sulfide, can all be added to the polymerizable mixture. Impact-resistance modifiers that are embedded in the form of a blend and/or that are chemically incorporated into the matrix material during the polymerization can be added to the polymerizable mixture. In this manner, the material properties of the plastic matrix can be systematically adapted to special requirements.

The method is preferably carried out at a temperature at which the reactive mixture is present in liquid form. This is the case if the temperature is above the melting temperature of the main component of the reactive mixture. The process is preferably conducted in such a way that the temperature remains below the melting temperature of the matrix material being formed. The temperature is between 65° C. [149° F.] and 240° C. [464° F.], depending on the mixture employed.

This temperature range is between 70° C. [158° F.] and about 220° C. [428° F.] for a matrix of polyamide 6 to be made from caprolactam; the temperature range is between 153° C. [307.4° F.] and about 180° C. [356° F.] for a matrix of polyamide 12 to be made from laurolactam.

The polymerization of cyclic butylene terephthalate oligomers to form polybutylene terephthalate is carried out at temperatures ranging between 160° C. [320° F.] and 230° C. [446° F.].

Furthermore, the invention relates to a pressure vessel, comprising: a hollow body; and a filament-plastic composite layer that sheathes the body, wherein the filament-plastic composite layer comprises a filament windingwrapping comprising a continuous filament embedded in a plastic matrix, wherein the plastic matrix is formed by polymerizing a polymerizable mixture having a viscosity <500 mPa·s. Such a pressure vessel comprises a liner and a reinforcement consisting of a filament-plastic composite layer. The filament-plastic composite layer consists of a filament winding embedded into a preferably thermoplastic matrix. Here, the matrix is formed by means of the polymerization of a polymerizable mixture that, under the selected process conditions, has a viscosity <500 mPa·s, preferably ≤200 mPa·s, especially preferably ≤100 mPa·s and very especially preferably ≤20 mPa·s.

The invention also encompasses a pressure vessel that comprises an inner hollow body that is covered with a filament-plastic composite layer consisting of a filament winding embedded in a preferably thermoplastic matrix. The filament-plastic composite layer, in turn, can be sheathed by an outer jacket made of the plastic matrix. Such an outer jacket has a thickness of 0.5 mm to 5 mm, preferably 1 mm to 3 mm.

In a preferred embodiment, the pressure vessel also has a functional element which is formed from the preferably thermoplastic matrix and which makes a one-piece transition to the matrix that embeds the filament winding. This functional element is made exclusively from the plastic that forms the matrix but not from the filament. This can be created in that, in order to form the functional element, a contour is provided in a partial area of the mold, which is filled with the mixture when the filament winding is impregnated with the polymerizable mixture. Thus, it is possible, for example, to incorporate fastening elements, and the like directly into the pressure vessel in the same processing step, without these fastening elements having to be produced and installed separately as is described in the state of the art.

The liner has a wall thickness between 1 mm and 10 mm, preferably between 2 mm and 5 mm.

The thickness of the filament-plastic composite layer is selected in such a way that, in conjunction with the mechanical properties of the selected continuous filaments as well as in conjunction with the design of the winding, strength values are achieved that meet the requirements of the envisaged application.

Additional objectives, features, advantages and application possibilities can be gleaned from the description in the drawings and embodiments. In this context, all of the described features on their own or in any desired combination constitute the subject matter of the invention, also irrespective of their compilation in the claims to which they refer back.

FIG. 1 shows a 3D depiction of a hollow body 1 made of plastic, which is especially made of a thermoplastic with an eye towards the subsequent material recovery. The production from a thermoplastic can be carried out by means of a familiar blow-molding or rotational-molding method. A connection element 3, only shown schematically, is provided on the liner 1, in the area of one of the ends 2 of the vessel. The wall 5 of the liner can be seen through the cutaway opening 4 (only drawn for the sake of clarity).

Figure 2:
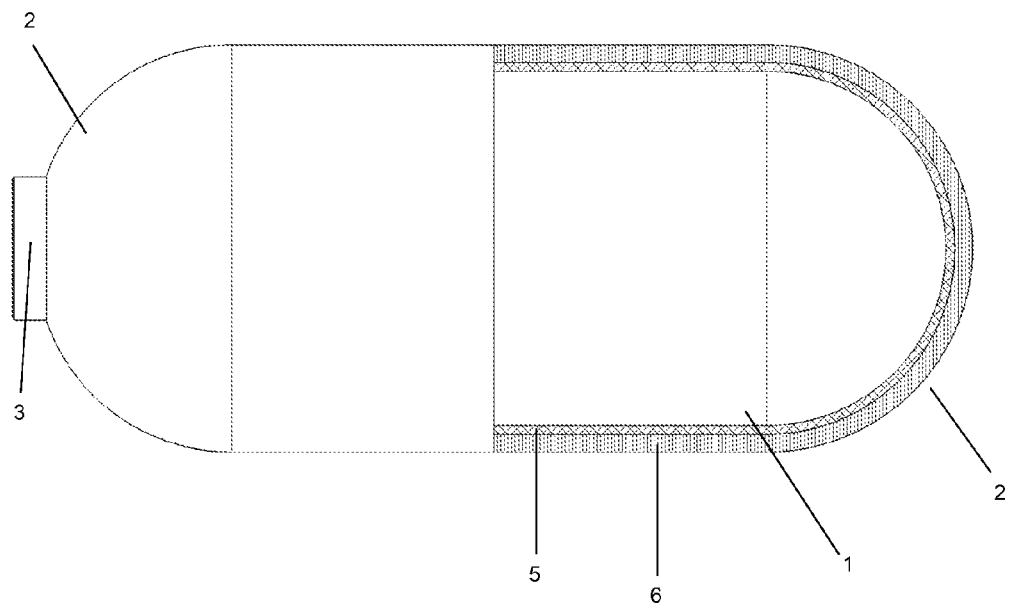
FIG. 2 a schematic cross section of the liner after the winding of the continuous filaments.

FIG. 2 schematically shows a partial section of the liner 1 after the filament winding 6 has been incorporated, as a result of which the finished pressure vessel later acquires the necessary strength. The filament winding 6 is not yet provided with matrix material; consequently, this is not yet a filament-plastic composite. Depending on the area of application and on the operating conditions of the pressure vessel, the filaments used in the filament winding 6 can be carbon and glass fibers or else aramide, boron, aluminum oxide and metallic fibers.

Figure 3:
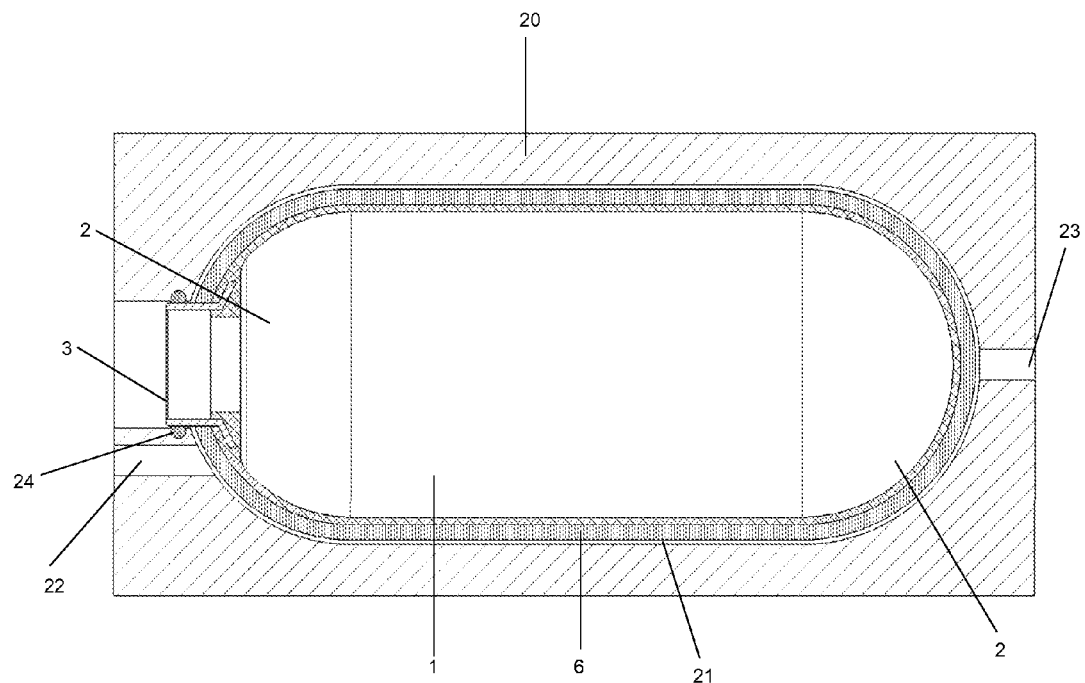
FIG. 3 a schematic cross section of the wound liner of FIG. 2 inserted into a mold.

In a cross section, FIG. 3 shows the wrapped liner 1 inside a mold 20. Here, one can also see the wall 5 of the liner 1 and the connection element 3 at one end 2 of the vessel. Here, too, the filament winding 6 has not yet been provided with matrix material. The mold 20 defines the outer contour of what will later be the outer shell and thus also of the finished pressure vessel. The mold is structurally configured in such a way that it encloses the connection element 3 that is integrated into the liner 1 so as to seal it with a gasket 24. In this manner, a cavity is formed by the outer surface of the liner 1 and by the inner surface of the mold 20.

If, as shown in FIG. 3, the mold is configured so that the inner contour of the mold 20 is somewhat larger than the outer contour of the filament winding 6, then a gap 21 is created between them. This yields another advantage of the method, since in this manner, the filament-plastic composite layer consisting of the filament winding 6 embedded in matrix material can form an outer shell (see FIGS. 4A and 4B) consisting exclusively of matrix material.

As is also shown in FIG. 3, at least one first opening 22 is provided in the mold for injecting the polymerizable mixture into the cavity. The cavity can be vented through this first opening 22. Preferably, however, a separate second opening 23 is provided in the mold, thereby simplifying the venting and the complete filling of the cavity. In order to assist the filling and venting, it has proven to be advantageous if the cavity can be evacuated via the second opening or via an optional third opening (not shown here) by means of a vacuum pump.

If the outside of the liner 1 is provided with deep grooves that continue along the outer circumference of the connection element 3, as shown in FIG. 1, then the mold and/or the connection element can be structurally designed in the area of the gasket 24 in such a way that the grooves on the outer circumference of the connection element take over the function of the first or second opening of the mold. In this manner, when the cavity is being filled with the polymerizable mixture, a pressure gradient can be built up in the normal direction relative to the filament winding 6, and this simplifies the soaking and impregnation.

In a modification of the method, instead of a solid mold, it is also possible to use a plastic film that is provided with feed and evacuation connections, preferably in the form of a bag that is made of suitable material and arranged around the wound liner 1 and sealed in the area of the connection element in such a way that the wound filament layers can be impregnated with the polymerizable mixture by means of a familiar vacuum infusion method. Thus, the vessel shape can be cost-effectively produced in very small quantities, since the production of a mold in a solid shape can be dispensed with.

Figure 4A:
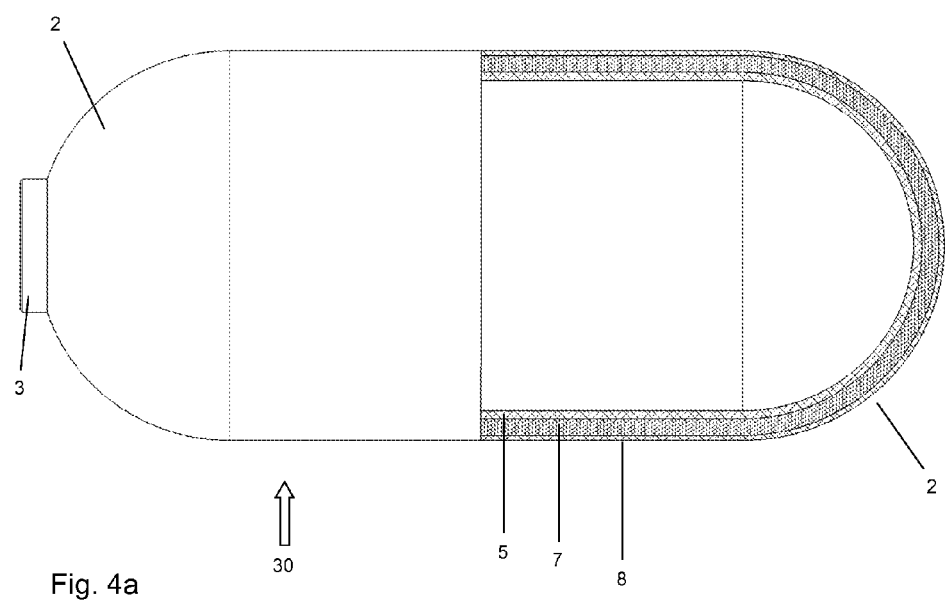
FIG. 4A a cross section of the wound body after the injection and polymerization of the polymerizable mixture.
Figure 4B:
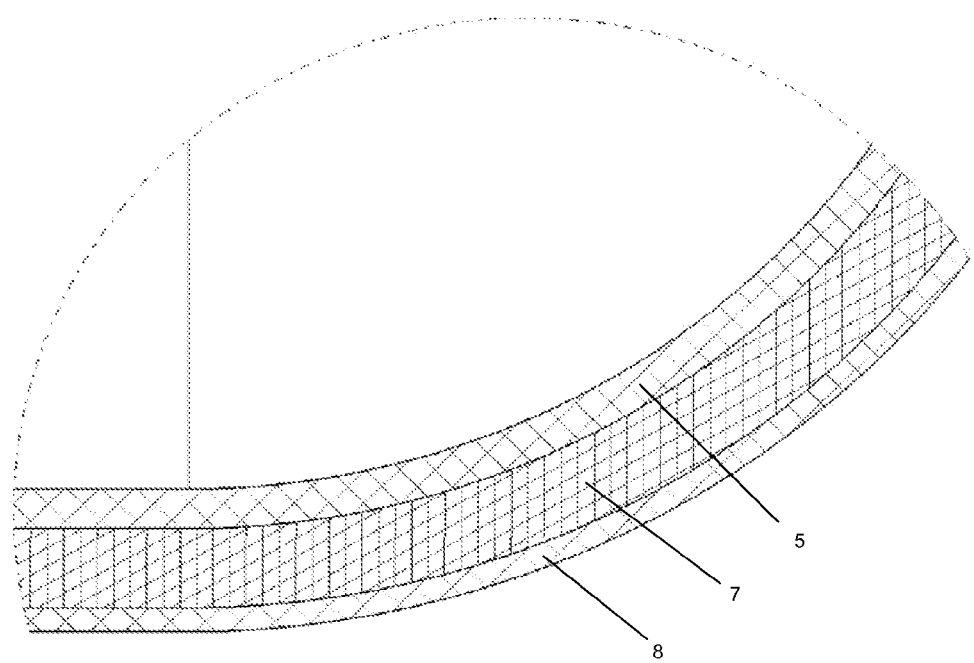
FIG. 4B a cross section of the wall of the pressure vessel.

FIG. 4A shows the finished pressure vessel 30 in a partial cross section. The filament winding is embedded in a matrix so that here, a load-bearing filament-plastic composite layer 7 is present (this is why it is depicted with a different cross-hatching than the filament winding 6 in FIG. 3). FIG. 4B shows a section through the wall of the pressure vessel. One can see the wall 5 of the liner 1, the filament-plastic composite layer 7 formed by embedding the filament winding 6 into the thermoplastic matrix, as well as the outer shell 8—consisting only of matrix material—created by the gap between the inner contour of the mold 20 and the outer contour of the filament winding 6.

Figure 5:
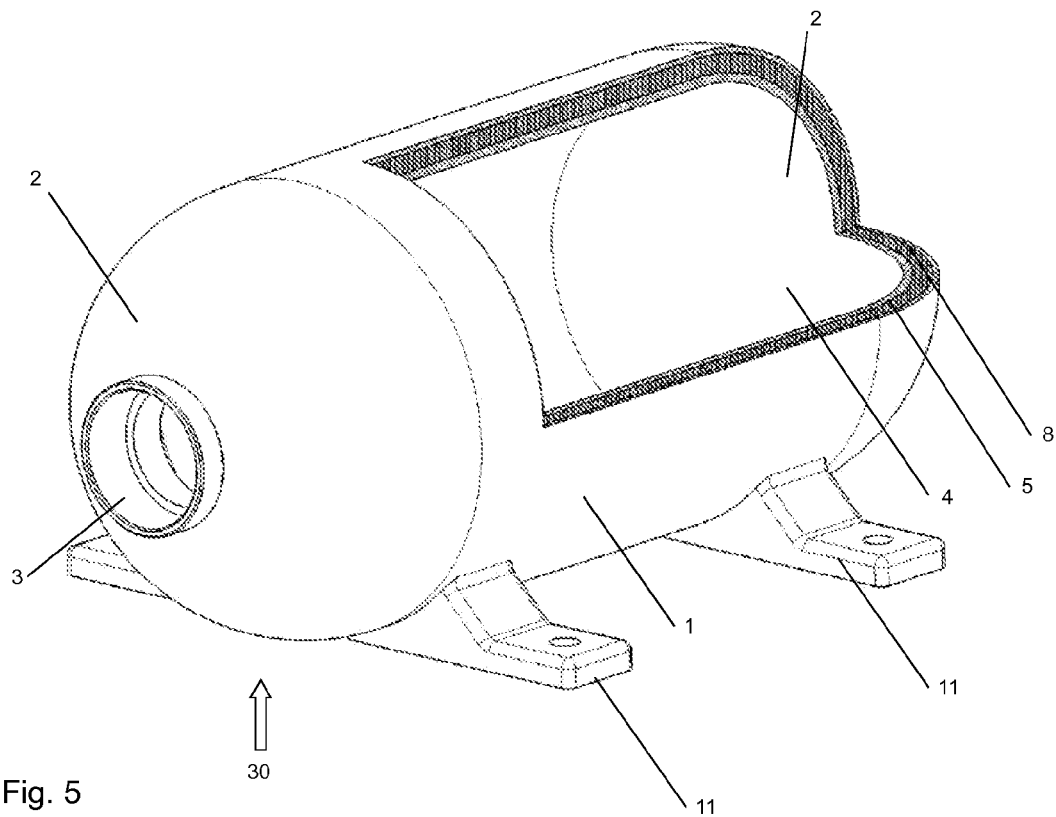
FIG. 5 a three-dimensional partially sectional view of the pressure vessel.

FIG. 5 shows a pressure vessel 30 with functional elements 11, which are molded on in one piece. The functional elements 11 shown here are fastening lugs. However, other shapes are also conceivable for the functional element in order to fulfill other functions such as, for example, functional elements that allow several vessels to be stacked and/or arranged and/or secured in a bundle of vessels.

A cylindrical liner having a volume of 20 liters and a connection element is produced by means of a generally known blow-molding method using polyamide (Durethan BC 550 Z). The liner is then wound with carbon filaments in a familiar manner. The wound liner is placed into a mold that surrounds it.

In two separate containers, premixes of ε-caprolactam with 0.6% by weight of sodium caprolactamate as the catalyst or ε-caprolactam with 0.9% by weight of hexamethylene-1,6-bis-carbamido-caprolactam as the activator are melted and kept on hand at 100° C. [212° F.]. The containers with the two premixes are connected via lines to a mixing head, from which one line leads to the mold. The mixing head, the lines between the containers with the premixes and the mixing head as well as the feed line from the mixing head to the mold can all be heated and are kept at 100° C. [212° F.].

The mold with the wrapped liner is set to a controlled temperature of 168° C. [334.4° F.]. The polymerizable mixture is injected into the cavity that is formed in the mold between its inner surface and the outer surface of the liner, in that the two premixes are combined in the mixing head in equal percentages by weight, thoroughly mixed and then fed into the mold within 20 seconds. After 5 minutes, the anionic polymerization is completed and the pressure vessel can be removed from the mold.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise.

LIST OF REFERENCE NUMERALS 1 hollow vessel
2 ends of the vessel
3 connection element
4 cutaway opening
5 wall of the vessel
6 filament winding
7 filament-plastic composite layer
8 outer shell
11 functional element
20 mold
21 gap between the inner surface of the mold and the outer surface of the filament winding
22 first opening
23 second opening
24 gasket
30 pressure vessel

The invention claimed is:

1. A method for producing a pressure vessel, the method comprising:
   (i) winding a hollow body with a continuous filament, to obtain a filament winding upon the hollow body, as a wound body;
   (ii) impregnating the filament winding with a polymerizable mixture while the wound body is inside a mold that surrounds the wound body; and
   (iii) polymerizing the polymerizable mixture so as to form a thermoplastic matrix that embeds the filament winding, wherein the thermoplastic matrix comprises polyamide 6, polyamide 12, a copolymer comprising polyamide 6 and polyamide 12, polybutylene terephthalate, thermoplastic polyurethane, or a mixture of two or more of any of these,
   wherein the continuous filament comprises a spacer.

2. The method of claim 1, wherein the polymerizable mixture has a viscosity <500 mPa·s.

3. The method of claim 1, wherein the hollow body comprises deep grooves on its outside.

4. The method of claim 1, wherein an inner surface of the mold is in direct contact with an outer surface of the filament winding.

5. The method of claim 1, wherein the polymerizable mixture comprises an impact-resistance modifier, a reinforcing filler, a non-reinforcing filler, a flame-retardant, a mold-release agent, a release agent and lubricant, a thermal conductivity increaser, an electrical conductivity increaser, a thermal and electrical conductivity increaser, a dye, a pigment, a stabilizer, a plasticizer, an anti-blocking agent, a thickener, a processing additive, or a mixture of two or more of any of these.

6. The method of claim 1, wherein the polymerizable mixture has a viscosity ≤200 mPa·s.

7. The method of claim 1, wherein the polymerizable mixture has a viscosity ≤100 mPa·s.

8. The method of claim 1, wherein the polymerizable mixture has a viscosity ≤20 mPa·s.

9. The method of claim 1, wherein the continuous filament comprises an aramide, boron, aluminum oxide, carbon, glass, or a mixture thereof.

10. The method of claim 1, wherein the continuous filament comprises a coating comprising a material that triggers or accelerates polymerization of the polymerizable mixture.

11. The method of claim 1, wherein the hollow body is formed from a same material as the thermoplastic matrix.

12. The method of claim 1, wherein, exclusively from other compounds, the polyamide 6, polyamide 12, the copolymer comprising polyamide 6 and polyamide 12, the polybutylene terephthalate, or the mixture of two or more of any of these enter into formation of the thermoplastic matrix.

13. A method for producing a pressure vessel, the method comprising:
   (i) winding a hollow body with a continuous filament, to obtain a filament winding upon the hollow body, as a wound body;

(ii) impregnating the filament winding with a polymerizable mixture while the wound body is inside a mold that surrounds the wound body; and (iii) polymerizing the polymerizable mixture so as to form a plastic matrix that embeds the filament winding, wherein there is a gap between an inner surface of the mold and an outer surface of the filament winding so that outside of the embedded filament at least one of a non-fiber-reinforced outer shell of a same material as the plastic matrix and additional functional elements attached in one piece with the plastic matrix is provided.

14. The method of claim 13, wherein the polymerizable mixture has a viscosity <500 mPa·s.

15. The method of claim 13, wherein the continuous filament comprises a spacer.

16. The method of claim 13, wherein the hollow body comprises deep grooves on its outside.

17. The method of claim 13, wherein the polymerizable mixture comprises an impact-resistance modifier, a reinforcing filler, a non-reinforcing filler, a flame-retardant, a mold-release agent, a release agent and lubricant, a thermal conductivity increaser, an electrical conductivity increaser, a thermal and electrical conductivity increaser, a dye, a pigment, a stabilizer, a plasticizer, an anti-blocking agent, a thickener, a processing additive, or a mixture of two or more of any of these.

18. The method of claim 13, wherein the polymerizable mixture has a viscosity ≤20 mPa·s.

19. The method of claim 13, wherein the continuous filament comprises an aramide, boron, aluminum oxide, carbon, glass, or a mixture thereof.

20. The method of claim 13, wherein the continuous filament comprises a coating comprising a material that triggers or accelerates polymerization of the polymerizable mixture.

21. The method of claim 13, wherein the hollow body is formed from a same material as the thermoplastic matrix.

22. The method of claim 13, wherein, exclusively from other compounds, the polyamide 6, polyamide 12, the copolymer comprising polyamide 6 and polyamide 12, the polybutylene terephthalate, or the mixture of two or more of any of these enter into formation of the thermoplastic matrix.

23. A method for producing a pressure vessel, the method comprising:
(i) winding a hollow body with a continuous filament, to obtain a filament winding upon the hollow body, as a wound body;
(ii) impregnating the filament winding with a polymerizable mixture while the wound body is inside a mold that surrounds the wound body; and
(iii) polymerizing the polymerizable mixture so as to form a thermoplastic matrix that embeds the filament winding, wherein the thermoplastic matrix comprises polyamide 6, polyamide 12, a copolymer comprising polyamide 6 and polyamide 12, polybutylene terephthalate, thermoplastic polyurethane, or a mixture of two or more of any of these,
wherein the hollow body comprises deep grooves on its outside.

24. The method of claim 23, wherein the polymerizable mixture has a viscosity <500 mPa·s.

25. The method of claim 23, wherein an inner surface of the mold is in direct contact with an outer surface of the filament winding.

26. The method of claim 23, wherein the polymerizable mixture comprises an impact-resistance modifier, a reinforcing filler, a non-reinforcing filler, a flame-retardant, a mold-release agent, a release agent and lubricant, a thermal conductivity increaser, an electrical conductivity increaser, a thermal and electrical conductivity increaser, a dye, a pigment, a stabilizer, a plasticizer, an anti-blocking agent, a thickener, a processing additive, or a mixture of two or more of any of these.

27. The method of claim 23, wherein the polymerizable mixture has a viscosity ≤20 mPa·s.

28. The method of claim 23, wherein the continuous filament comprises an aramide, boron, aluminum oxide, carbon, glass, or a mixture thereof.

29. The method of claim 23, wherein the continuous filament comprises a coating comprising a material that triggers or accelerates polymerization of the polymerizable mixture.

30. The method of claim 23, wherein the hollow body is formed from a same material as the thermoplastic matrix.

31. The method of claim 23, wherein, exclusively from other compounds, the polyamide 6, polyamide 12, the copolymer comprising polyamide 6 and polyamide 12, the polybutylene terephthalate, or the mixture of two or more of any of these enter into formation of the thermoplastic matrix.

32. A method for producing a pressure vessel, the method comprising:
(i) winding a hollow body with a continuous filament, to obtain a filament winding upon the hollow body, as a wound body;
(ii) impregnating the filament winding with a polymerizable mixture while the wound body is inside a mold that surrounds the wound body; and
(iii) polymerizing the polymerizable mixture so as to form a thermoplastic matrix that embeds the filament winding, wherein the thermoplastic matrix comprises polyamide 6, polyamide 12, a copolymer comprising polyamide 6 and polyamide 12, polybutylene terephthalate, thermoplastic polyurethane, or a mixture of two or more of any of these,
wherein the polymerizable mixture comprises an impact-resistance modifier, a reinforcing filler, a non-reinforcing filler, a flame-retardant, a mold-release agent, a release agent and lubricant, a thermal conductivity increaser, an electrical conductivity increaser, a thermal and electrical conductivity increaser, a dye, a pigment, a stabilizer, a plasticizer, an anti-blocking agent, a thickener, a processing additive, or a mixture of two or more of any of these.

33. The method of claim 32, wherein the polymerizable mixture has a viscosity <500 mPa·s.

34. The method of claim 32, wherein an inner surface of the mold is in direct contact with an outer surface of the filament winding.

35. The method of claim 32, wherein the polymerizable mixture has a viscosity ≤20 mPa·s.

36. The method of claim 32, wherein the continuous filament comprises an aramide, boron, aluminum oxide, carbon, glass, or a mixture thereof.

37. The method of claim 32, wherein the continuous filament comprises a coating comprising a material that triggers or accelerates polymerization of the polymerizable mixture.

38. The method of claim 32, wherein the hollow body is formed from a same material as the thermoplastic matrix.

39. The method of claim 32, wherein, exclusively from other compounds, the polyamide 6, polyamide 12, the copolymer comprising polyamide 6 and polyamide 12, the polybutylene terephthalate, or the mixture of two or more of any of these enter into formation of the thermoplastic matrix.

40. A method for producing a pressure vessel, the method comprising:
(i) winding a hollow body with a continuous filament, to obtain a filament winding upon the hollow body, as a wound body;
(ii) impregnating the filament winding with a polymerizable mixture while the wound body is inside a mold that surrounds the wound body; and
(iii) polymerizing the polymerizable mixture so as to form a thermoplastic matrix that embeds the filament winding, wherein the thermoplastic matrix comprises polyamide 6, polyamide 12, a copolymer comprising polyamide 6 and polyamide 12, polybutylene terephthalate, thermoplastic polyurethane, or a mixture of two or more of any of these,
wherein the hollow body is formed from a same material as the thermoplastic matrix.

41. The method of claim 40, wherein the polymerizable mixture has a viscosity <500 mPa·s.

42. The method of claim 40, wherein an inner surface of the mold is in direct contact with an outer surface of the filament winding.

43. The method of claim 40, wherein the polymerizable mixture has a viscosity <20 mPa·s.

44. The method of claim 40, wherein the continuous filament comprises an aramide, boron, aluminum oxide, carbon, glass, or a mixture thereof.

45. The method of claim 40, wherein the continuous filament comprises a coating comprising a material that triggers or accelerates polymerization of the polymerizable mixture.

46. The method of claim 40, wherein, exclusively from other compounds, the polyamide 6, polyamide 12, the copolymer comprising polyamide 6 and polyamide 12, the polybutylene terephthalate, or the mixture of two or more of any of these enter into formation of the thermoplastic matrix.

* * * * *